Sept. 15, 1959  C. D. MULLIN ET AL  2,904,639
TEMPLE CONSTRUCTION
Filed Sept. 22, 1958
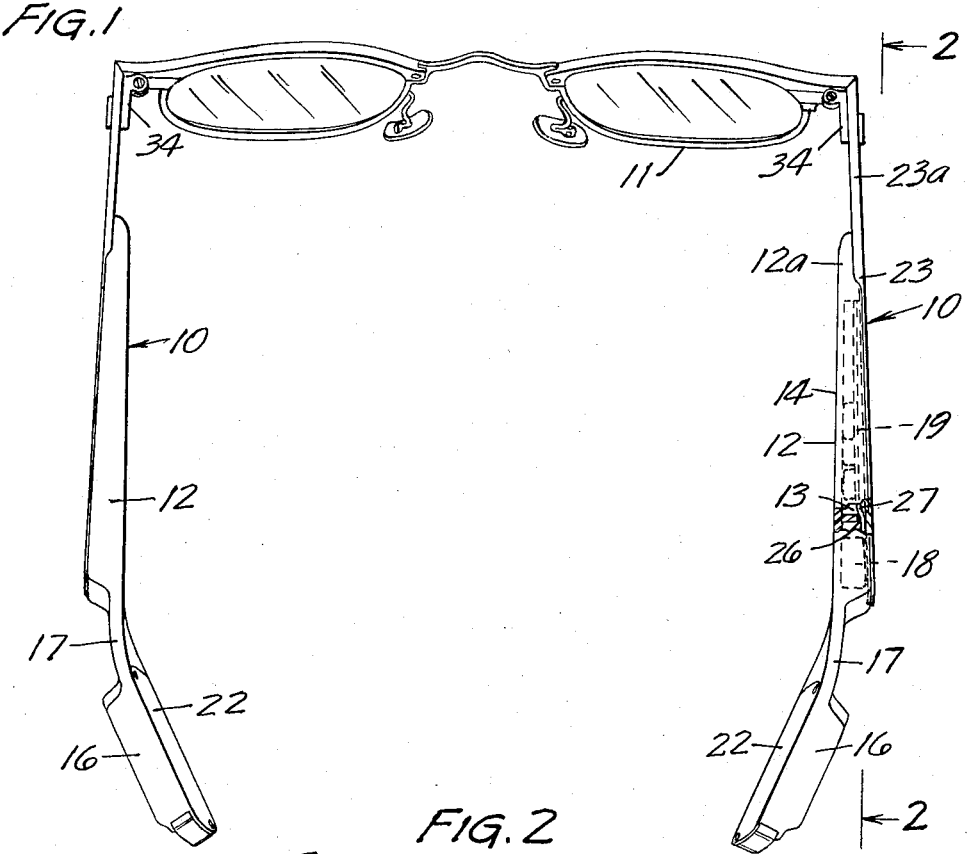
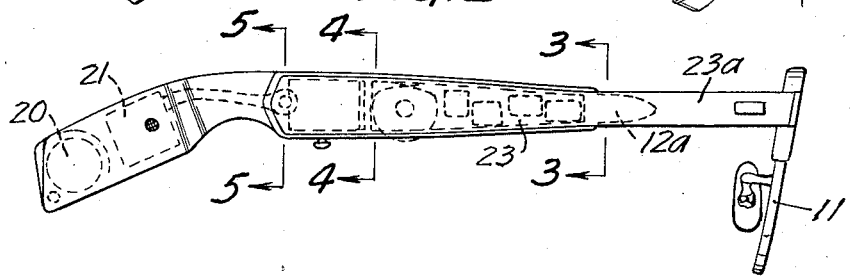
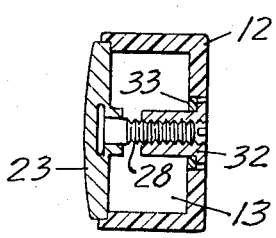
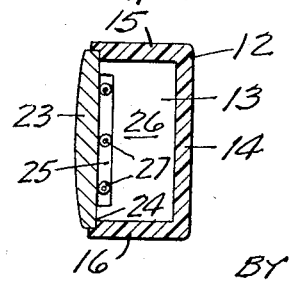
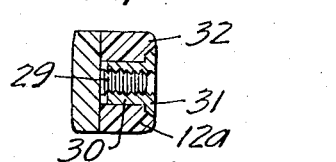
INVENTORS
CLAYTON D. MULLIN
JOHN F. ROSE
BY Williamson, Schroeder & Halmatier
ATTORNEYS United States Patent Office 2,904,639
Patented Sept. 15, 1959

2,904,639

TEMPLE CONSTRUCTION

Clayton D. Mullin, St. Paul, and John F. Rose, Minneapolis, Minn., assignors to Maico Electronics, Inc., Minneapolis, Minn., a corporation of Minnesota Application September 22, 1958, Serial No. 762,416

6 Claims. (Cl. 179—107)

This invention relates to a temple construction for spectacle-mounted hearing aids and the like.

An object of our invention is to provide a new and improved temple of simple and inexpensive construction and operation for the use in spectacle-mounted hearing aids.

Another object of our invention is the provision of a novel temple construction for mounting hearing aid circuitry and circuit components of such a nature as to substantially eliminate the deteriorating effect of body perspiration on the important hearing aid components and circuitry.

Still another object of our invention is to provide an improved and novel hearing aid-mounting temple construction which is adapted to be readily fitted along with a pair of spectacles to a person's head and which is further adapted to present a pleasing ornamental appearance and to conceal to a great extent the hearing aid unit.

A further object of our invention is the provision of a new and novel hearing aid-mounting temple construction which facilitates ready and easy replacement of the hearing aid unit with a minimum of inconvenience so that the wearer is not required to go without a hearing aid nor is he required to use a temple which is not fitted to his head while his own hearing aid unit is being serviced.

These and other objects and advantages of our invention will be more apparent from the following description made in connection with the accompanying drawings wherein like reference characters refer to similar parts throughout the several views and in which:

Fig. 1 is a top plan view of a pair of spectacles or eye glasses incorporating the present invention, and showing the corner of the temples, partly in section for clarity of detail;

Fig. 2 is a side elevation view of the eye glasses and temple construction, and being taken approximately on a plane as indicated at 2—2 in Fig. 1;

Fig. 3 is a detail section view taken at approximately 3—3 in Fig. 2;

Fig. 4 is a detail section view taken at approximately 4—4 in Fig. 2; and

Fig. 5 is detail section view taken at approximately 5—5 in Fig. 2.

One form of the present invention is shown in the drawing and is described herein. The temple members are indicated in general by numeral 10 and the two temple members are substantially identical with each other except that they are arranged for the right and left sides of the person's head for supporting the spectacle frame 11. The spectacle frame may be of any suitable design.

Each of the temple members 10 includes an elongate housing 12 which is adapted to lie along the side of the person's head. Each of the housings 12 has a forward compartment 13 which may be divided into two or more chambers. The housing 12 has a closed inner side 14 which is impervious to passage of moisture, and the inner side 14 will engage the side of the person's head in most cases. The housing 12 also has top and bottom sides 15 and 16 respectively which are also impervious to passage of moisture thereto.

The housing, in the form shown, is molded of a suitable, and substantially rigid plastic material in integral one-piece construction. The rear end portion 16 of each of the housings 12 is shaped at 17 to easily pass over the top of the person's ear and to generally follow the curvature of the person's head.

The housing 12 has an open outer side which provides access into the compartment 13. The compartment 13 contains a number of the components of the electrical hearing aid circuitry. Such components may include a speaker 18 and the signal-amplifying transistor circuit 19, both of which are subject to be damaged by moisture when present in the compartment 13. At the extreme rear end 16 of each of the housings 12, another inner chamber is provided which may contain the battery 20 and the microphone 21. The chamber which houses the battery 20 and microphone 21 may open in an inward direction and be normally closed by the cover plate 22.

An elongate plate 23 overlies the open outer side of the housing 12 to completely close the chamber 13. It will be seen that the rear end portion of plate 23 tapers divergently to follow the general configuration or shape of the housing 12. The side and end edges of plate 23 rest upon shoulder surfaces 24 which are defined in the housing walls. It will be seen that spaces 25 may be left between the plate 23 and the ribs or divider walls 26 which divide the compartment 13 into various chambers so as to permit wires 27 to pass from one chamber to another.

Means are provided for releasably and removably attaching the plate 23 to the outer side of housing 12, and in the form shown, such means include a pair of threaded studs 28 and 29 which are respectively affixed, as by welding to the forward and rear portions of metal plate 23. A threaded nut 30 having a flared and slotted head portion 31 is seated in an aperture 32 in the forward end 12a of the housing which is disposed forwardly from the end of chamber 13 and is threadably connected with the stud 29. A similar nut 32 is seated in an aperture 33 in the inner side of housing 12 adjacent the rear portion of compartment 13, and is threadably connected with the stud 28 for securing the rear portion of the cover plate 23.

It will be specifically noted that the forward end portion 23a of the plate extends forwardly beyond the end 12a of the housing 12 and is quite slim and is designed to closely resemble the bow or temple of a conventional pair of spectacles. The forward end portion 23a is connected in the usual fashion to a hinge structure 34 which is also connected to the spectacle frame 11 in the conventional manner.

The temple member 10 which incorporates a complete hearing aid unit facilitates ready and easy fitting of a complete spectacle hearing aid unit to a person's head. A housing 12 containing the complete hearing aid unit may be fitted to any one of a number of plates 23 of different lengths so that the portion 17 of the housing is properly positioned in relation to the position of the spectacle frame. The person who fits the unit to the head of the wearer may keep a supply of cover plates 23 on hand in various lengths so that the proper length may be chosen and then quickly applied to housing 12 and then attached to hinge structure 34.

When the hearing aid unit contained within the housing 12 needs servicing, the entire housing may be easily removed from the plate 23 by merely removing the nuts 30 and 32. If the hearing aid unit must be kept in the shop or sent to the factory another hearing aid unit or housing 12 may be quickly applied to the plate 23 and loaned to the owner of the spectacles so that he need not go without a hearing aid and so that the unit which is loaned to him will fit equally as well as his own unit which has been removed.

It will be understood that the cover plate 23 may have embellishments or designs engraved or otherwise applied thereon. Because the housing 12 terminates at 12a well rearwardly from the front end of plate 23, the entire housing 12 may be quite inconspicuously concealed and in fact, the housing 12 will be almost completely concealed if the spectacles are worn by a woman.

The importance of preventing perspiration from entering the chamber 13 is emphasized. It is essential to a practical hearing aid temple construction that access be provided into the inner chamber. In the present invention the access is provided at the outer side of the housing and the completely closed inner side is impervious to passage of moisture so that the hearing aid circuitry will not be damaged by normal perspiration from a person's head.

It will be seen that we have provided a new and novel temple construction which substantially eliminates moisture due to perspiration, from entering the compartment wherein the electrical hearing aid circuitry is contained and which also provides for ready and easy fitting of the temple to the proper size for a particular person and also provides for a ready and easy interchange of the hearing aid units without the need for refitting the temple to the wearer.

It will of course be understood that various changes may be made in the form, details and arrangement of parts, all without departing from the scope of our invention.

What is claimed is:

1. A temple member including a hearing aid unit; for use with spectacles, comprising an elongate housing adapted to extend in a fore and aft direction adjacent the side of a person's head and having a forward compartment with an outer side and a closed moisture-impervious inner side adapted to engage the side of a person's head to prevent entry of perspiration into the compartment of the housing, the housing also having an intermediate portion of reduced thickness to pass between the head and the helix of the ear and to be supported on the ear, and said housing also having a rear portion, a complete hearing aid unit carried by said housing, an elongate plate lying along and extending forwardly from the forward portion of said housing and being adapted for attachment to the spectacle frame, and releasable means securing said plate to the housing.

2. A temple member including electrical circuitry for use with a spectacle frame, comprising an elongated housing having a forward compartment having an outer side and a closed inner side adapted to lie against the side of a person's head, the compartment having an access opening through the outer side thereof, electrical circuitry within the compartment and exposed to the exterior through said opening, an elongate plate overlying the outer side of the compartment and closing said opening, said plate having a forward end portion extending beyond the end of the housing and being adapted for attachment to the spectacle frame, and releasable means securing said plate to the housing.

3. A temple member including electrical hearing aid circuitry for use with a spectacle frame, comprising an elongated housing adapted to extend in a fore and aft direction adjacent the side of a person's head, said housing having a forward compartment having an outer side and a closed moisture-impervious inner side adapted to engage the side of a person's head and to prevent entry of perspiration into the compartment, the compartment having an access opening through the outer side thereof, electrical hearing aid circuitry within the compartment and exposed to the exterior through said opening, an elongate plate overlying the outer side of the compartment and closing said opening, said plate having a forward end portion extending beyond the end of the housing and being adapted for attachment to the spectacle frame, and releasable means securing said plate to the housing.

4. A temple member including electrical hearing aid circuitry for use with a spectacle frame, comprising an elongated housing to be oriented substantially horizontally along the side of a person's head and having a forward compartment with an outer side and a closed moisture-impervious inner side adapted to engage the person's head, said housing also having top and bottom sides formed integrally with the inner side to prevent entrance of perspiration into the compartment from the person's head, the outer side of said housing being open to provide access into the compartment, electrical hearing aid circuitry in the compartment and exposed to the exterior through said open outer side, an elongate plate overlying and closing the open outer side of the housing and having a forward end portion extending beyond the forward end of the housing and being adapted for attachment to the spectacle frame, and releasable means securing said plate to the housing.

5. A temple member including electrical hearing aid circuitry for use with a spectacle frame, comprising an elongated housing adapted to extend in a fore and aft direction adjacent the side of a person's head and having a forward compartment with an outer side and a closed inner side adapted to engage the side of a person's head, said housing also having a closed top side formed integrally with said inner side to prevent entry of perspiration into the compartment from the person's head, the outer side of the compartment being open to provide access into the compartment, electrical hearing aid circuitry within the compartment and exposed to the exterior through the open outer side, removable means releasably secured to the housing and including a cover overlying and closing the open outer side of the housing and also including a forwardly extending projection extending forwardly from the forward portion of the housing, said projection having a forward end spaced forwardly from the housing and being adapted for attachment to the spectacle frame.

6. A temple member including electrical circuitry for use with a spectacle frame, comprising an elongated housing having a forward compartment having an outer side and a closed inner side adapted to lie against the side of a person's head, the compartment having an access opening through the outer side thereof, electrical circuitry within the compartment and exposed to the exterior through said opening, an elongate plate overlying the outer side of the compartment and closing said opening, and releasable means securing said plate to the housing.

References Cited in the file of this patent
UNITED STATES PATENTS 2,856,466    Gustafson et al. ---------- Oct. 14, 1958

FOREIGN PATENTS 737,115    Great Britain ---------- Sept. 21, 1958
794,347    Great Britain ---------- Apr. 30, 1958